United States Patent [19]

Barney et al.

[11] Patent Number: 6,070,143
[45] Date of Patent: *May 30, 2000

[54] SYSTEM AND METHOD FOR ANALYZING WORK REQUIREMENTS AND LINKING HUMAN RESOURCE PRODUCTS TO JOBS

[75] Inventors: Matthew F. Barney, Bowling Green, Ohio; Scott T. Harkey, Macungie, Pa.; Kenneth Pearlman, Sarasota, Fla.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/985,444

[22] Filed: Dec. 5, 1997

[51] Int. Cl.[7] .................................................. G06F 17/60
[52] U.S. Cl. ................................................ 705/8; 706/900
[58] Field of Search .................................. 705/7, 8, 9, 10, 705/11; 706/900, 902, 1, 2, 3, 4, 5, 6, 7, 8

[56] References Cited

U.S. PATENT DOCUMENTS 5,416,694   5/1995   Parrish et al. ............................ 364/401

OTHER PUBLICATIONS

Tim Minahan, "SF–171 on its way out, but paper still in place. (Office of Personnel Management)", Government Computer News, v13, n15, p. 70, Jul 18, 1994.

Tim Minahan, "DOD, OPM open doors of first paperless personnel office", Government Computer News, v13, n9, p. 61, May 2, 1994.

Kevin Power, "This is the man to help you find a job (Richard A. Whitford, the Office of Personnel Management's director of employment information—interview)", Government Computer News, v14, n10, p. 26, May 15, 1995.

James M. Smith, "Interior to implement departmentwide use of MARS (the Office of Personnel Management's Microcomputer Assisted Rating System)", Government Computer News, v13, n19, p. 108, Aug. 29, 1994.

U.S. Office of Personnel Management, "Federal Job Recruiting Notice", U.S. Patent & Trademark Office, pp. 1–22, Nov. 1996.

Wong, Daniel W. et al., "Toward the Development of a Second Generation Computerized Job–Matching System for Persons with Disabilities: A Conceptual Framework", The Journal of Rehabilitation, vol. 58, No. 1, p. 70(8), Jan.–Mar., 1992.

*Primary Examiner*—Eric W. Stamber
*Assistant Examiner*—Susanna Meinecke-Diaz

[57] ABSTRACT

For use with a computer, a job analysis system and a method of operating a computer to allow it to perform job analysis. In one embodiment, the job analysis system includes: (1) a master job analysis database containing work-oriented, worker-oriented and work context dimensions and work-oriented, worker-oriented and work context dimension job analysis survey portions associated therewith, (2) a products database containing human resource products and (3) a knowledge management module, associated with the master job analysis database. The knowledge management module includes: (3a) a survey assembly program that allows a user to select ones of the work-oriented, worker-oriented and work context dimensions from the master job analysis database and creates a job analysis survey from the associated ones of the job analysis survey portions and (3b) a survey analysis program that allows the user to identify key worker-oriented dimensions and links the key worker-oriented dimensions to the human resource products in the product database.

26 Claims, 13 Drawing Sheets

FIG. 9

Job Analysis Wizard – [Confirmation Survey Taxonomy]

Lucent Technologies Job Analysis Confirmation Survey Program
Microelectronics International University (MEIU)

Job Name: Patent Attorney

The outline to the right provides you with information regarding the different sections you will be asked to rate. It is like a road map that tells you exactly where you are in the process of completing the survey.

For your convenience, the number of items in each section are shown to the right of the section title. A total time to complete is shown at the bottom of the outline. As you complete a section the time to complete can be updated by pressing "Update Time".

To rate a section, click on the section title. When you have completed all sections press "Finished". To save your work and finish later press "Finish Later".

Job Characteristics Outline

Work Characteristics | Items/Remain
--- | ---
• Tasks | 0/0
• Tools | 1/1
• Context | 0/0

Worker Characteristics

| | Items/Remain |
--- | ---
• Knowledges | 1/1
• Skills | 0/0
• Abilities | 2/2
• Education | 0/0
• Certifications | 0/0
• Languages | 0/0
• Experience | 0/0
• Work Styles | 0/0

Work Environment

Time to complete: [.7] minutes

[Finished] [Finish Later]

Start | Job Analysis Wiza...

FIG. 10

TKSAO Selection

Set Linkage Matrix Parameters

WORK REQUIREMENTS
- Context
- Generalized Work Behaviors
  - Coaching, Training, Mentoring and Counseling
    - Coaching Individuals and Work Teams (GWS0028)
    - Conducting Informal/On-the-Job Training (GWS0020)
    - Delivering Process and Procedure Training to Employees (G
    - Delivering Product Training to Employees (GWS0168)
    - Delivering Training and Seminars to Customers (GWS0006)
    - General Skills for the Trainer (GWS0179)
- WORKER REQUIREMENTS TKSAO Items for Selected Dimension ☑ Coach and motivate students during training activities. (JLS0010)
  (Dif:0/3) (Imp:0/3)

☑ Develop organizational and individual performance objectives and performance improvement plans with team members. (XXS0006)
  (Dif:0/5) (Imp:0/5)

☑ Advise managers and employees on the interpretation and application of Performance Management theory. (MNS0031)
  (Dif:0/4) (Imp:0/3)

☑ Coach and provide on-the-job training in Information Technologies to team members to improve their skills and knowledge. (CPS0062)
  (Dif:0/3) (Imp:0/4)

☑ Coach others in the understanding of LUCENT, its overall business, its culture and the inter-relatedness of its functions, strategies, systems and processes.
  (Dif:0/3) (Imp:0/5)

Remove items with a Standard Deviation> ☐
Remove items with a Mean< ☐

Start    TKSAO Selection    Help    Save and Exit

FIG. 11A

| Form1 | | | |
|---|---|---|---|
| ⬤ | Lucent Technologies Job Analysis Confirmation Survey Program | | |
| | Microelectronics International University (MEIU) | | |

Job Analysis Wizard Linkage Matrix

| Task/KSAO | Speaking (Talking to others to effectively convey information). | Time Sharing (The ability to efficiently shift back and forth between two or more activities or sources of information (such as speech, sounds, touch, or other sources). | |
|---|---|---|---|
| Manage an inventory of equipment and parts at the corporate, business unit or organization level. (IMS0051) | No | | |
| Open new accounts such as money markets, CD's and savings. | Yes | | |

SYSTEM AND METHOD FOR ANALYZING WORK REQUIREMENTS AND LINKING HUMAN RESOURCE PRODUCTS TO JOBS

TECHNICAL FIELD OF THE INVENTION

The present invention is directed, in general, to computer systems and, more specifically, to a computer-based system and method for assessing work requirements relating to jobs and linking human resource products to the assessed jobs.

BACKGROUND OF THE INVENTION

Job analysis, a method of acquiring job requirement information, is a foundation of most human resource systems. Job requirement information typically consists of work-oriented information and worker-oriented information. Work-oriented information focuses on aspects of a work performed (e.g., tasks, roles, environment), while worker-oriented information focuses on attributes of a worker that are required successfully to perform the work (e.g., knowledge, skills, abilities). Both types of job requirement information are required to design and redesign jobs and to create human resource products, such as performance appraisals, personnel selection systems and training curricula.

A traditional approach to job analysis requires a job analyst, usually an industrial/organizational psychologist, to acquire job requirement information by observing and interviewing incumbent workers and supervisors. The job analyst may also personally perform job tasks to better understand the job requirements. Next, using the acquired job requirement information, the job analyst creates "paper and pencil"-based surveys to be completed by subject matter experts. Subject matter experts include not only the pertinent workers and supervisors, but also any other persons with a knowledge of the job requirements. The job analyst then uses results from the surveys to refine the job requirement information, generate reports and establish a foundation for various human resource systems.

The traditional approach, however, has a number of serious shortcomings. Validity, accuracy and legal defensibility of the job analysis may vary as a function of the job analyst's effectiveness. Further, while some companies may have a long history of job analysis work, paper-based storage of job analysis data, coupled with a turnover of job analysts, may cause valuable job requirement information to become unavailable. Therefore, relatively few prior analyses may be available to assist with future job analyses. Human resource systems created in the past may therefore have to be recreated, incurring additional costs. Also, redundant job analyses may be performed since human resources personnel in one part of a company may not be aware of human resource systems developed in another part of the same company.

Traditionally, the job analysis is completely customized for each job. As a result, the job analysis may extend over a long period of time, since subject matter experts are required to give the job analyst information regarding both the work performed and the attributes of workers required for effective performance. In many cases, the job analysis may last several months. Subject matter experts must, of course, forego other tasks to participate in the job analysis. Opportunity costs associated with the subject matter experts may, therefore, constitute a significant portion of the cost of the job analysis.

More recently, job analysts have created a number of automated approaches to job analysis. Some automated approaches, for instance, a Position Analysis Questionnaire (PAQ) and a Common 20 Metric Questionnaire (CMQ), administer only generalized surveys regarding job requirements. Operating only on personal computers (PCS), the PAQ and CMQ are stand-alone software packages tailored for individual use. Information sharing between human resource personnel is therefore hindered. Further, the PAQ and CMQ do not provide access to pre-existing human resource products. In addition, the PAQ focuses exclusively on work-oriented information, wholly neglecting worker-oriented information.

Another automated approach is a Comprehensive Occupational Data Analysis Program (CODAP) system, developed by the U.S. Army. The CODAP, however, does not provide access to pre-existing human resource products.

A further automated approach is an O*Net World Wide Web (WWW)-based system, currently under construction for the U.S. Department of Labor. The O*Net is designed to provide information regarding general duties of different jobs. While useful as a starting point, the O*Net system provides only a superficial scale for knowledge and work behavior, thereby severely limiting its utility to job analysts. Further, O*Net does not provide links to human resource products, and requires manual administration of all WWW-based scales.

Yet another automated approach is disclosed in U.S. Pat. No. 5,416,694 by Hughes Training, entitled "Computer-based Data Integration and Management Process for Workforce Planning and Occupational Readjustment." The patented system is intended for use in career planning, development and placement of persons into positions available with various employers. The patented system does not analyze a particular job, but merely employs a database containing jobs, skills and available employment positions. Further, the patented system is designed for use by a single individual, thereby limiting its usefulness to human resource personnel in various locations.

None of the available software systems ensures ongoing data integrity, given changes in work and worker related attributes. Further, no existing approach allows the job analyst quickly to identify, review and manipulate pre-existing products constructed from past job analyses, such as training courses or test batteries.

Accordingly, what is needed in the art is a system and method for automating job analyses that allows accessibility across wide geographical spans and multiple types of computer platforms, provides links to pre-existing human resource products and contains a system to ensure ongoing data integrity.

SUMMARY OF THE INVENTION

To address the above-discussed deficiencies of the prior art, the present invention provides, for use with a computer, a job analysis system and a method of operating a computer to allow it to perform job analysis. In one embodiment, the job analysis system includes: (1) a master job analysis database containing work-oriented, worker-oriented and work context dimensions and work-oriented, worker-oriented and work context dimension job analysis survey portions associated therewith, (2) a products database containing human resource products and (3) a knowledge management module, associated with the master job analysis database. The knowledge management module includes: (3a) a survey assembly program that allows a user to select ones of the work-oriented, worker-oriented and/or work context dimensions from the master job analysis database and creates two types of job analysis surveys from the associated sections of the job analysis survey portions and (3b) a survey analysis program that allows the user to identify key worker-oriented dimensions and links the key worker-oriented dimensions to the human resource products in the product database.

The present invention therefore introduces the broad concept of allowing job analysis to be carried out in a standard, comprehensive, legally defensible manner across wide geographic spans and ensuring that job analysis, once performed, remains available over time for the benefit of later job analyses needed anywhere in the world and efficiently provides access to relevant human resource products.

In one embodiment of the present invention, the survey assembly program comprises: (1) a selection program that creates a preliminary job analysis survey from the associated ones of the job analysis survey portions and (2) a survey analysis program that analyzes responses to the preliminary job analysis survey to determine a relevance of the selected ones of the work-oriented, worker-oriented and work context dimensions and produces a final job analysis survey from the preliminary job analysis survey based on the relevance. Thus, the present invention automates an iterative process to job analysis surveys, wherein the surveys are honed over time to increase accuracy. Of course, such iteration is not necessary to the present invention.

In one embodiment of the present invention, the system further includes a network interface, associated with the knowledge management module, that allows the user to communicate with the knowledge management module via a computer network coupled to the computer. In an embodiment to be illustrated and described, the system is operable over a computer network, allowing remotely-located users to participate in a unified job analysis process. The network may include or be the Internet.

In one embodiment of the present invention, the user communicates with the knowledge management module via a graphical user interface (GUI) on a user terminal. Those skilled in the art are familiar with the power, flexibility, familiarity and simplicity of GUIs on user terminals such as PCS. The present invention, can, but is not required to, operate with such GUIs. In fact, in a more specific embodiment of the present invention, the user communicates with the knowledge management module via a PC executing a World Wide Web browser.

In one embodiment of the present invention, the work-oriented dimensions are hierarchically organized into generalized work behaviors, work context, tools and generalized work activities. The taxonomy of this hierarchical organization will be described and illustrated in detail below.

In one embodiment of the present invention, the worker-oriented dimensions are selected from the group consisting of: (1) knowledge statements, (2) skills, (3) abilities, (4) work styles (personality traits), (5) education, (6) certifications and (7) languages. Those skilled in the art will recognize, however, that other dimensions may be necessary or desirable, depending upon the particular job(s) being analyzed.

In one embodiment of the present invention, the products database contains pre-existing human resource products selected from the group consisting of: (1) performance appraisals, (2) personnel selection systems, (3) tests, (4) training curricula, (5) job aides and (6) Americans with Disabilities Act (ADA) accommodation. As with the above, those skilled in the art will recognize that other products may be necessary or desirable, depending upon the particular job(s) being analyzed.

In one embodiment of the present invention, the survey analysis program is capable of adding new work-oriented, worker-oriented and work context dimensions to the master job analysis database. This allows the master job analysis database to evolve and become more current and comprehensive over time.

A storage medium containing computer instructions for creating the job analysis system is disclosed herein. The storage medium may be any conventional circuit-based, optical or magnetic medium or any later-discovered medium for storing computer instructions or data.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 9 illustrates an exemplary preliminary survey program of an embodiment of the job analysis wizard of FIG. 1;

FIG. 10 illustrates an exemplary filter output screen of an embodiment of the job analysis wizard of FIG. 1; and FIG. 11 illustrates an exemplary linkage matrix output screen of an embodiment of the job analysis wizard of FIG. 1.

DETAILED DESCRIPTION

Figure 1:
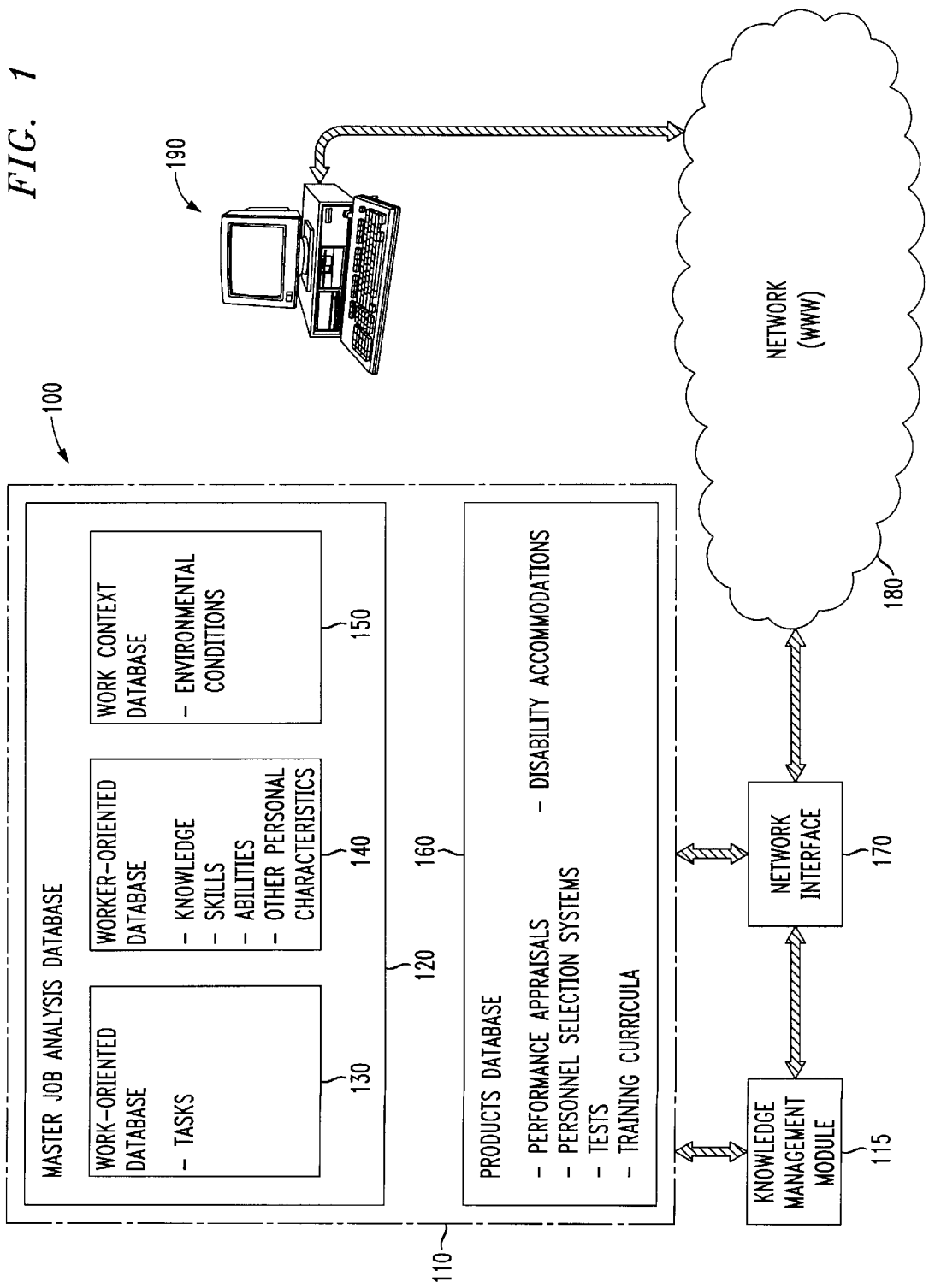
FIG. 1 illustrates an embodiment of a job analysis wizard constructed according to the principles of the present invention.

Referring initially to FIG. 1, illustrated is an embodiment of a job analysis system (termed "wizard" in the following description) 100 constructed according to the principles of the present invention. The illustrated job analysis wizard 100 contains a relational database 110, comprising a master job analysis database 120 and a products database 160. Those skilled in the art will realize that the master job analysis database 120 and the products database 160 may be separate databases, or may be contained within a single database. The job analysis wizard 100 further contains a knowledge management module 115, coupled to the relational database 110. The job analysis wizard 100 further contains a network interface 170, coupled to the relational database 110 and the knowledge management module 115, that allows the relational database 110 and the knowledge management module 115 to be reached via the WWW 180. The job analysis wizard 100 still further contains a user terminal 190, couplable to the network 180, that provides access to the relational database 110 via the network 180 and the network interface 170. In the illustrated embodiment, the user terminal 190 is a PC having a web browser. Of course, the user terminal 190 may be any computer platform capable of providing access to the network 180. Further, while the illustrated embodiment operates via the WWW 180 to allow access by a variety of different computer platforms located in diverse geographic locations, those skilled in the art will realize that use of the job analysis wizard 100 with any type of network is well within the broad scope of the present invention. In one alternative embodiment, the user terminal 190 may be directly coupled to the relational database 110. In another alternative embodiment of the present invention, the job analysis wizard 100 may reside in a stand-alone computer system. In a related embodiment, the job analysis wizard 100 may be operable on a standalone computer system.

In the illustrated embodiment, the master job analysis database 120 is further divided into a work-oriented database 130, a worker-oriented database 140 and a work context database 150. The work-oriented database 130 contains all work-oriented dimensions (e.g., tasks). The worker-oriented database 140 contains all worker-oriented dimensions (e.g., knowledge, skills, abilities and other personal characteristics). The work context database 150 contains all work context dimensions (e.g., environmental conditions). Those skilled in the art will realize that the master job analysis database 120 may not necessarily include all of the above-mentioned databases and dimensions. Alternatively, the master job analysis database 120 may contain other databases or dimensions not herein described.

In one embodiment of the present invention, the products database 160 contains pre-existing (previously created) human resource products including, for instance, performance appraisals, personnel selection systems, tests, job aides, ADA accommodations and training curricula.

In a related embodiment, the work-oriented database 130 contains 2400 task statements hierarchically housed within 290 Generalized Work Behaviors, which are, in turn, contained within 16 Generalized Work Activities. In another related embodiment of the present invention, the worker-oriented database 140 contains over 1000 knowledge statements arranged within six hierarchical levels, 30 skills arranged within four hierarchical levels and 52 abilities arranged within 15 meso-level categories and 4 macro-level categories. While the databases are described in terms of a specific hierarchical structure, those skilled in the art will realize that the use of other hierarchical structures is well within the broad scope of the present invention.

Figure 2:
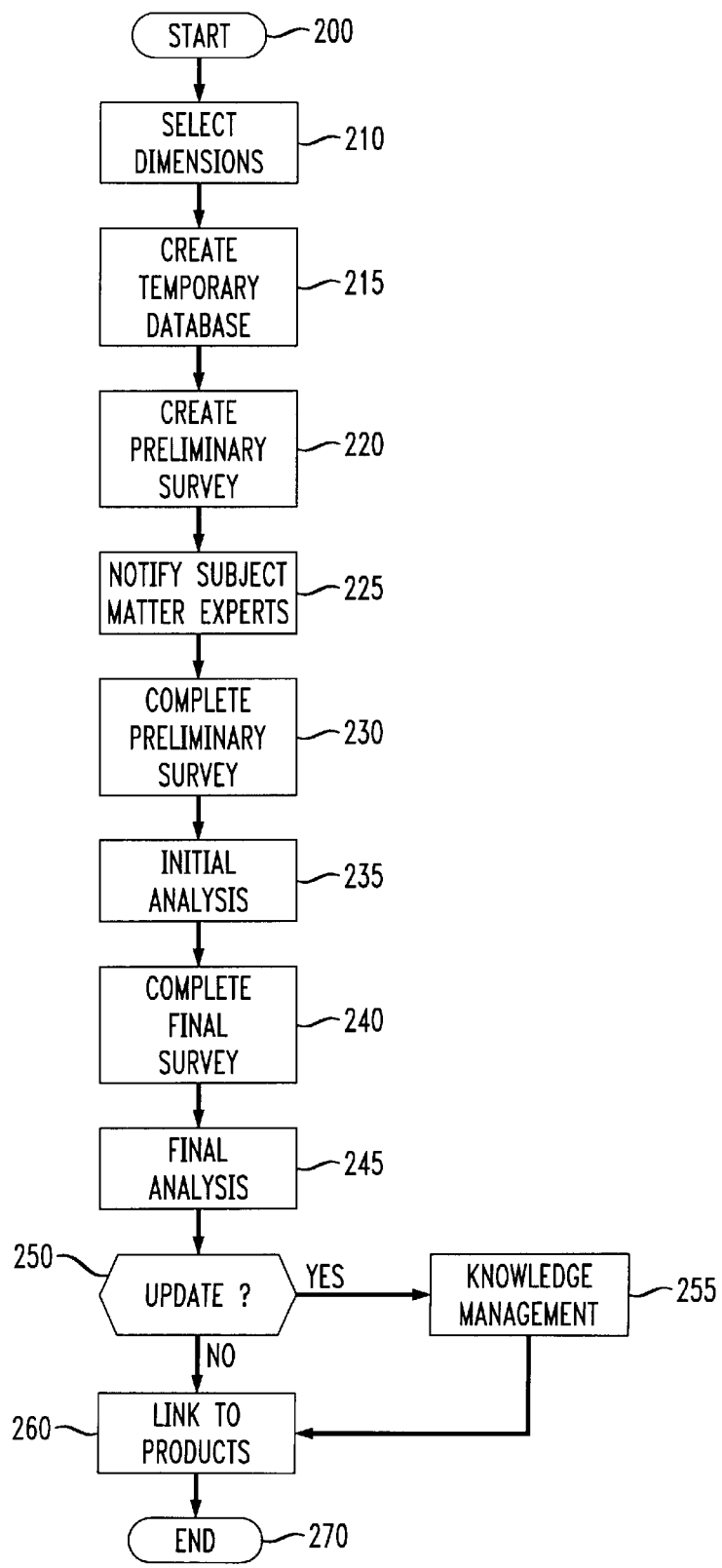
FIG. 2 illustrates a flow diagram of an exemplary method for operating the job analysis wizard of FIG. 1.

Turning now to FIG. 2, illustrated is a flow diagram of an exemplary method for operating the job analysis wizard 100 of FIG. 1. With continuing reference to FIG. 1, the job analysis wizard 100 operates as follows. The method begins at a start step 200. To begin an analysis of a particular job, at a dimensions selection step 210, an analyst accesses a job dimension selection program in the master job analysis database 120. The analyst uses the selection program to select work-oriented, worker-oriented and work context dimensions that are relevant to the job. Relevant job dimensions may be determined through prior understanding, discussion with subject matter experts, or from observation of the job tasks. Of course, other methods of determining relevant job dimensions may also be used.

Then, in a temporary database creation step 215, the job dimension selection program creates a temporary job analysis database containing only the selected dimensions. Since each dimension contains a pre-constructed job analysis survey, the job dimension selection program extracts the pre-constructed job analysis surveys from the temporary job analysis database and creates therefrom a customized, WWW-based, preliminary survey (see first survey creation step 220). In the illustrated embodiment, the master job analysis database 120 is accessible via the WWW. Analysts with low bandwidth connections to the WWW may, alternatively, download the job dimension selection program. In a preferred embodiment, the job dimension selection program is designed to operate with various types of user terminals 190 and operating systems.

Next, in a subject matter expert notification step 225, the job analysis wizard provides subject matter experts with a network address of the preliminary survey. In one embodiment of the present invention, the job analysis wizard 100 automatically notifies relevant subject matter experts of a Uniform Resource Locator (URL) of the preliminary survey via e-mail. Those skilled in the art will realize that other methods of notifying the subject matter experts are well within the broad scope of the present invention. Alternatively, the preliminary survey may be sent directly to the subject matter experts. In another embodiment of the present invention, the preliminary survey may be administered to the subject matter experts via the analyst's user terminal 190.

Located on the WWW, the preliminary survey is accessible by the user terminal 190. Subject matter experts in geographically diverse locations may, therefore, complete the preliminary survey at a preliminary survey completion step 230. Alternatively, the subject matter experts may download the preliminary survey for completion on the user terminal 190. In one embodiment of the present invention, the survey asks the subject matter experts to rate on appropriate scales (e.g., difficulty, importance, frequency) and certain dimensions (e.g., tasks, knowledge, skills, abilities and other personal characteristics) relevant to the job. Those skilled in the art will realize that the scope of the survey is not limited to the above-described dimensions or scales, but may also include other dimensions or scales not illustrated herein.

Once the subject matter experts have completed the preliminary survey, at an initial data analysis step 235, the job analysis wizard 100 allows the analyst to determine dimensions that are critical to the job. In a preferred embodiment, the job analysis wizard 100 allows the analyst to obtain a completion status of the preliminary surveys. In a related embodiment, the job analysis wizard 100 informs the analyst regarding subject matter experts who have not completed the preliminary surveys. The analyst may then specifically request the procrastinating subject matter experts to promptly complete the preliminary surveys.

Once a sufficient number of preliminary surveys have been completed, unimportant dimensions may then be filtered from the temporary job analysis database. In one embodiment, the job analysis wizard 100 compiles the preliminary surveys and allows the analyst to review a standard deviation and mean for each dimension. In a related embodiment, the job analysis wizard allows the analyst to set limits on the standard deviation and mean for each dimension, thereby filtering dimensions that are either unimportant or are subject to disagreement among the subject matter experts.

Next, a final survey is created and made available to the subject matter experts. In one embodiment of the present invention, the final survey asks the subject matter experts to link critical work-oriented dimensions to critical worker-oriented dimensions. The subject matter experts then complete the final survey at a final survey completion step 240.

In one embodiment of the present invention, at a final analysis step 245, the job analysis wizard 100 allows the analyst to identify key worker-oriented dimensions that span many tasks. Next, at a decisional step 250, the job analysis wizard determines whether the job requires new dimensions that are not contained in the relational database 110. If the job requires new dimensions, the knowledge management module 115 updates the relational database 100 in a knowledge management step 255 and the method then continues to a product linkage step 260. If the knowledge management step 255 is not required, the method proceeds directly to the product linkage step 260. Here, the job analysis wizard 100 identifies pre-existing human resource products (e.g., performance appraisals, personnel selection systems, tests and training curricula) corresponding to dimensions required by the job. In one embodiment of the present invention, the job analysis wizard 100 contains hotlinks that provide convenient access to the products. The analyst may then download the products for immediate use, or for use in creating new products. The job analysis wizard 100 thus allows for rapid development and implementation of new human resource products by leveraging pre-existing products as a starting point.

In the illustrated embodiment of the present invention, the knowledge management module 115 allows knowledge data in the relational database 110 to be continually updatable. Of course, other work, worker and work context dimensions may also be updated as required.

One embodiment of the present invention uses a fuzzy logic approach to updating the relational database 110. Following is a simplified example of the fuzzy logic approach, illustrating a relationship between knowledge and tasks contained in the job analysis wizard 100. In this embodiment, five sets of data are required.

A knowledge set K includes knowledge elements k contained in the job analysis wizard 100. A task set T includes task elements t contained in the job analysis wizard 100. A fuzzy membership set M includes fuzzy membership elements m representing a fuzzy membership function between the knowledge set K and the task set T. A new knowledge set $K_{new}$ includes new knowledge elements $k_{new}$ that may be placed into the job analysis wizard 100. A new membership set $M_{new}$ includes new membership elements $m_{new}$ representing a fuzzy membership function between the new knowledge set $K_{new}$ and the task set T.

Knowledge elements k are linked to task elements t by membership elements m. The fuzzy membership set M is derived from past job analyses that indicate whether a particular knowledge is required to perform a specific task. The fuzzy membership element m thus serves as a profile of each knowledge element k across each task element t, regardless of the job. In a preferred embodiment of the present invention, the fuzzy membership set M is dynamic, constantly updated by the job analysis wizard as new job analyses are performed.

New knowledge may be added to the relational database 110. In one embodiment, the knowledge management module 115 determines a position in the hierarchical structure for the new knowledge by calculating Fuzzy Indices of Dissimilarity (FIDS) between the new knowledge and all other pre-existing knowledges. In a preferred embodiment, the FIDS calculates a sum of absolute values of differences between fuzzy membership elements m of each pre-existing knowledge and the new knowledge. The FIDS thus allows the new knowledge to be placed within the hierarchical structure near other similar knowledge dimensions.

Following is an exemplary method for calculating the FIDS. The job analysis wizard 100 contains first, second, third and fourth task elements A, B, C, D and first and second knowledge sets $K\alpha$, $K\beta$ having the following fuzzy membership elements:

$$K\alpha = \{A/0.7, B/0.3, C/0, D/0.2\}$$

$$K\beta = \{A/0.2, B/0.2, C/0.9, D/0.1\}$$

A job analyst determines that a new knowledge set $\chi$, having the following fuzzy membership elements $$K\chi = \{A/0.3, B/0.2, C/0.7, D/0.1\}$$

should be added to the job analysis wizard 100. FIDS must, therefore be calculated between $K\chi$ and all other knowledge sets $K\alpha$, $K\beta$ to determine a closest fit. The FIDS calculation proceeds as follows:

$\alpha\chi$ $$FIDS_{\alpha\chi} = |K\alpha A - K\chi A| + |K\alpha B - K\chi B| + |K\alpha C - K\chi C| + |K\alpha D - K\chi D|$$

$$FIDS_{\alpha\chi} = |0.7-0.3| + |0.3-0.2| + |0-0.7| + |0.2-0.1|$$

$$FIDS_{\alpha\chi} = 0.4 + 0.1 + 0.7 + 0.1$$

$$FIDS_{\alpha\chi} = 1.3$$

$\beta\chi$ $$FIDS_{\beta\chi} = |K\beta A - K\chi A| + |K\beta B - K\chi B| + |K\beta C - K\chi C| + |K\beta D - K\chi D|$$

$$FIDS_{\beta\chi} = |0.2-0.3| + |0.2-0.2| + |0.9-0.7| + |0.1-0.1|$$

$$FIDS_{\beta\chi} = 0.1 + 0 + 0.2 + 0$$

$$FIDS_{\beta\chi} = 0.3$$

Since the FIDS is smallest between the new knowledge set $K\chi$ and the second knowledge set $K\beta$, the new knowledge set $K\chi$ should be placed into the hierarchy near the second knowledge set $K\beta$. This knowledge management approach can be employed for adding any work or worker-oriented dimension to the taxonomy, knowledge is used here as an example.

The job analysis wizard 100 conducts all job analyses using analogous methodology, scales and taxonomies. Strategic human resources analyses may therefore be performed in support of new business initiatives.

Figure 3:
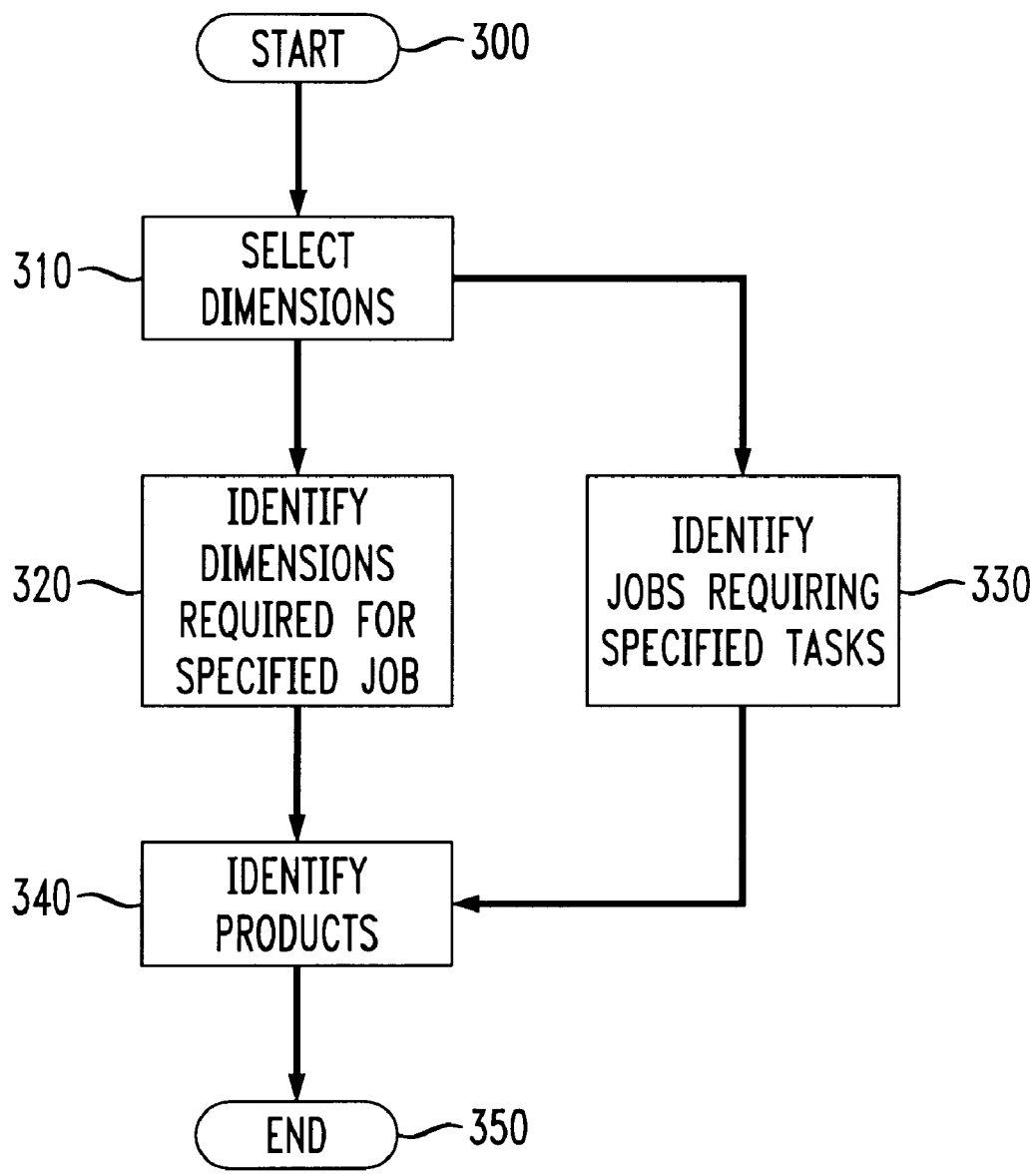
FIG. 3 illustrates a flow diagram of an exemplary method for operating the job analysis wizard of FIG. 1 to perform strategic analysis.

Turning now to FIG. 3, illustrated is a flow diagram of an exemplary method for operating the job analysis wizard 100 of FIG. 1 to perform strategic analysis. The method begins at a start step 300. Upon discovering a possibility of a new business initiative, human resources personnel may use the job analysis wizard 100 to select dimensions that are critical to making the initiative successful (at a select dimensions step 310). In the illustrated embodiment, specific jobs or tasks may be selected at the select dimensions step 310. If a specific job is selected, the method continues to a job identification step 320, wherein all work and worker-oriented dimensions required for the job may be examined. The method then continues to a product identification step 340. Alternatively, if a specific task is selected, the method proceeds to a task identification step 330, wherein all jobs requiring the particular task are identified. The method then continues to a product identification step 340. Pre-existing products available to support the initiative may then be examined. The method then ends at an end step 350.

The new business initiative may new require worker-oriented dimensions (e.g., new knowledge, skills). Human resources personnel may be required to develop new products (e.g., training courses and tests) to assist workers in developing the required dimensions, or selecting workers with critical dimensions before they are hired. The job analysis wizard 100 assists in the development effort by providing pre-existing products as a starting point for the development of the new products.

Figure 4:
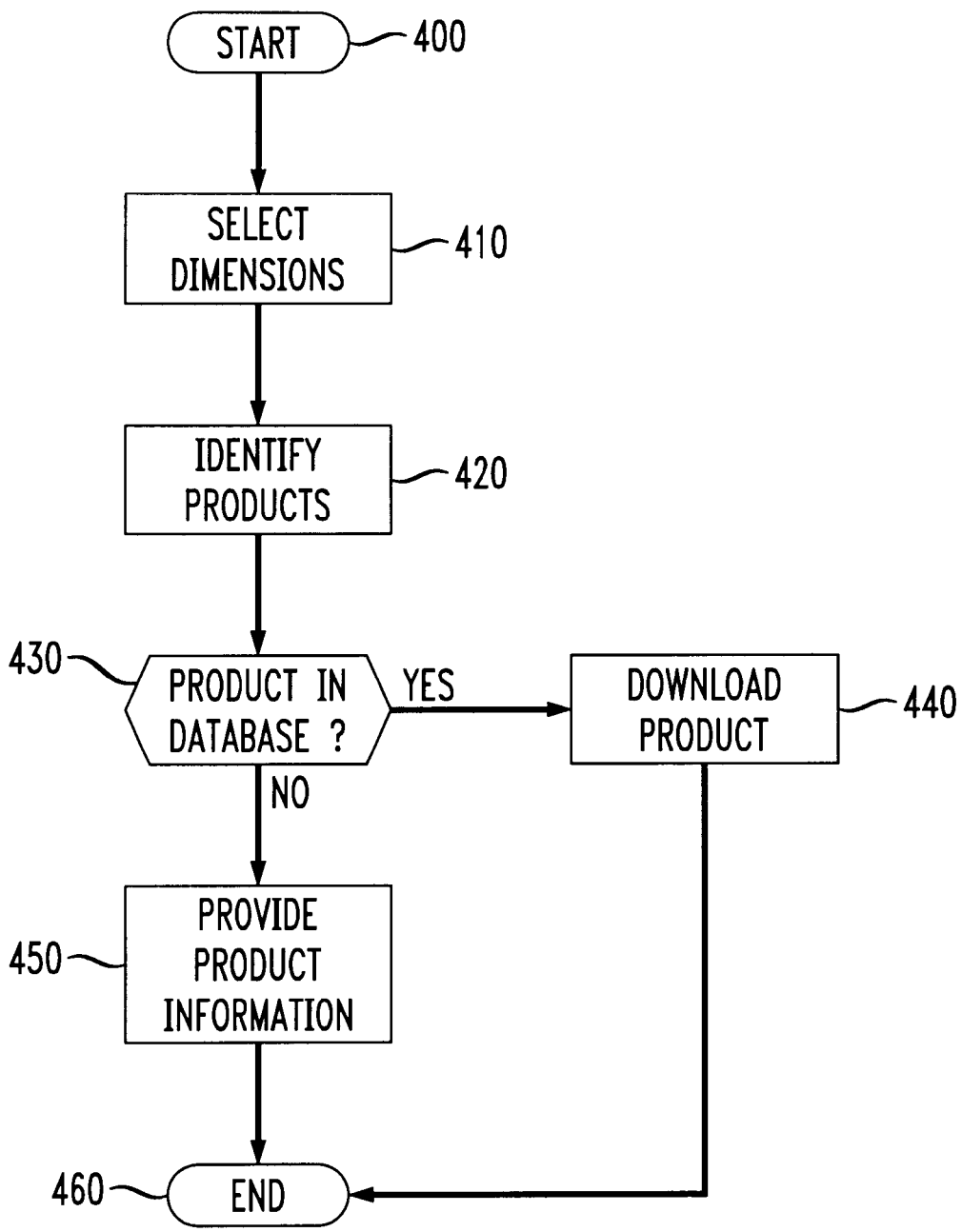
FIG. 4 illustrates a flow diagram of an exemplary method for operating the job analysis wizard of FIG. 1 to perform product review.

Turning now to FIG. 4, illustrated is a flow diagram of an exemplary method for operating the job analysis wizard 100 of FIG. 1 to perform product review. The method begins at a start step 400. An analyst selects required dimensions at a dimension selection step 410. Then, at a product identification step 420, the job analysis wizard provides the analyst with a list of pre-existing products corresponding to the selected dimensions. At a decisional step 430, the job analysis wizard determines whether the pre-existing products are stored in the products database 160. If so, the job analysis wizard 100 allows the analyst to download the products at a download step 440. The method then ends at an end step 460. If the pre-existing products are not stored in the products database 160, the job analysis wizard may provide the analyst with demographic information to assist the analyst in locating the pre-existing products (at a product information step 450). The method then ends at the end step 460.

Figure 5:
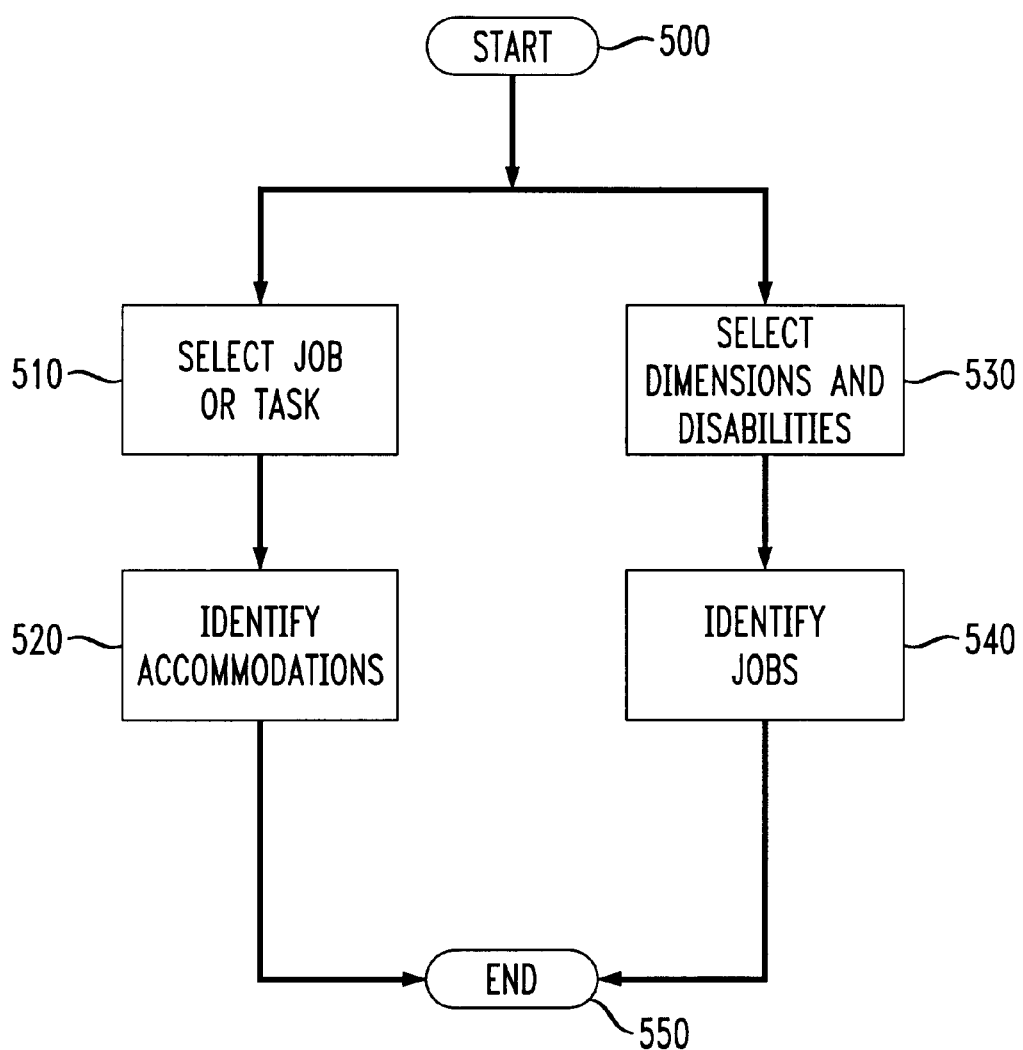
FIG. 5 illustrates a flow diagram of an exemplary method for operating the job analysis wizard of FIG. 1 to perform ADA queries.

Turning now to FIG. 5, illustrated is a flow diagram of an exemplary method for operating the job analysis wizard 100 of FIG. 1 to perform ADA queries. The method begins at a start step 500. In the illustrated embodiment, human resources personnel may select a specific job or task (at a select job step 510). The job analysis wizard then identifies any previous ADA accommodations made (at an identify accommodations step 520). The method then concludes at an end step 550. Alternatively, the human resources personnel may locate jobs that require some worker-oriented dimensions, but do not require other worker-oriented dimensions (at a select dimensions and disabilities step 530). The job analysis wizard then locates and identifies available jobs to the human resources personnel at an identify jobs step 540. The method then concludes at an end step 550. The job analysis wizard may thus assist human resources personnel in providing reasonable accommodation under the ADA.

Figure 6:
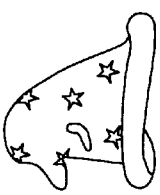
FIG. 6 illustrates an exemplary job title output screen of an embodiment of the job analysis wizard of FIG. 1.
Figure 7:
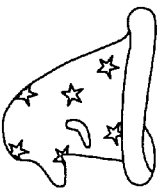
FIG. 7 illustrates an exemplary job information output screen of an embodiment of the job analysis wizard of FIG. 1.
Figure 8A:
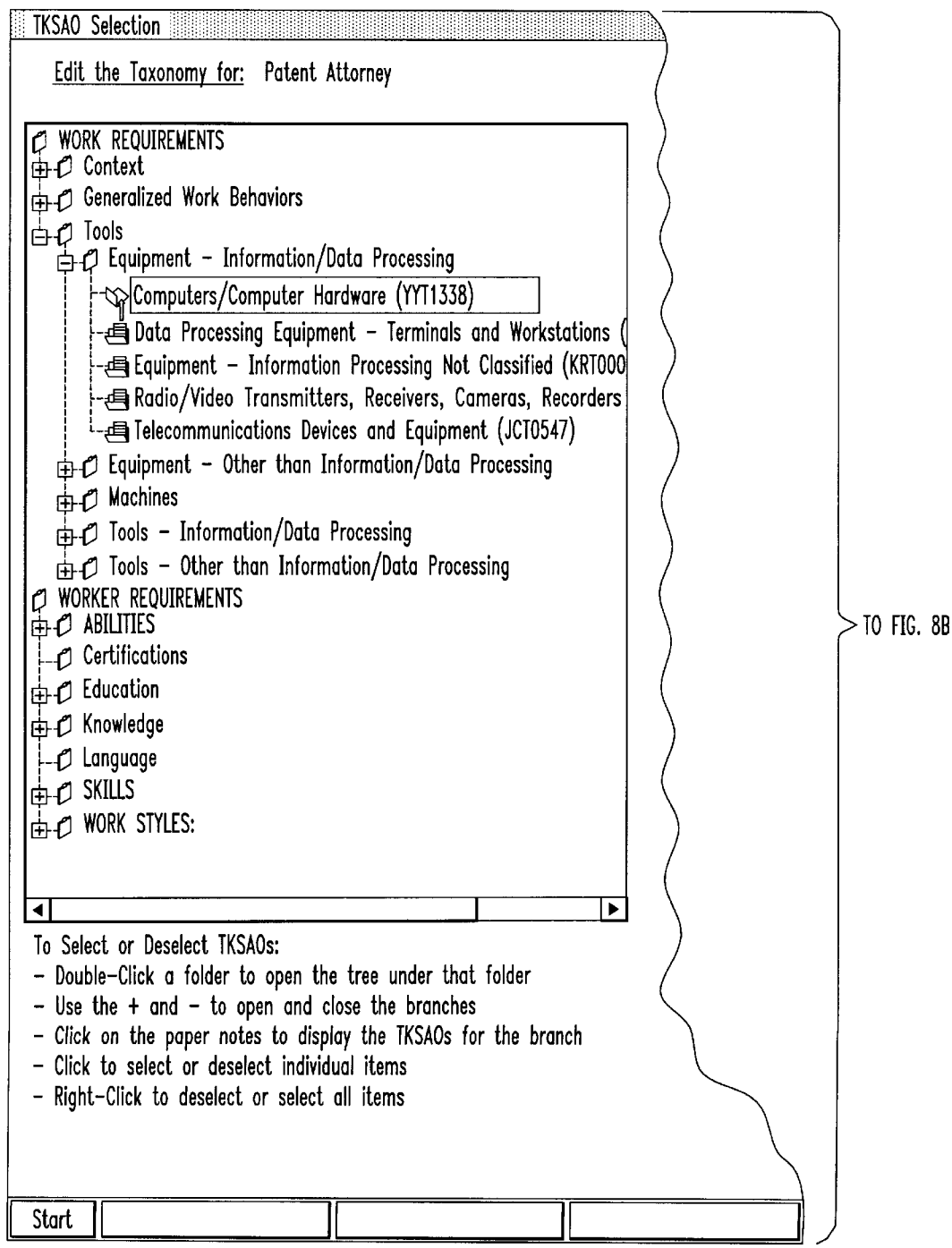
FIG. 8 illustrates an exemplary taxonomy output screen of an embodiment of the job analysis wizard of FIG. 1.
Figure 8B:
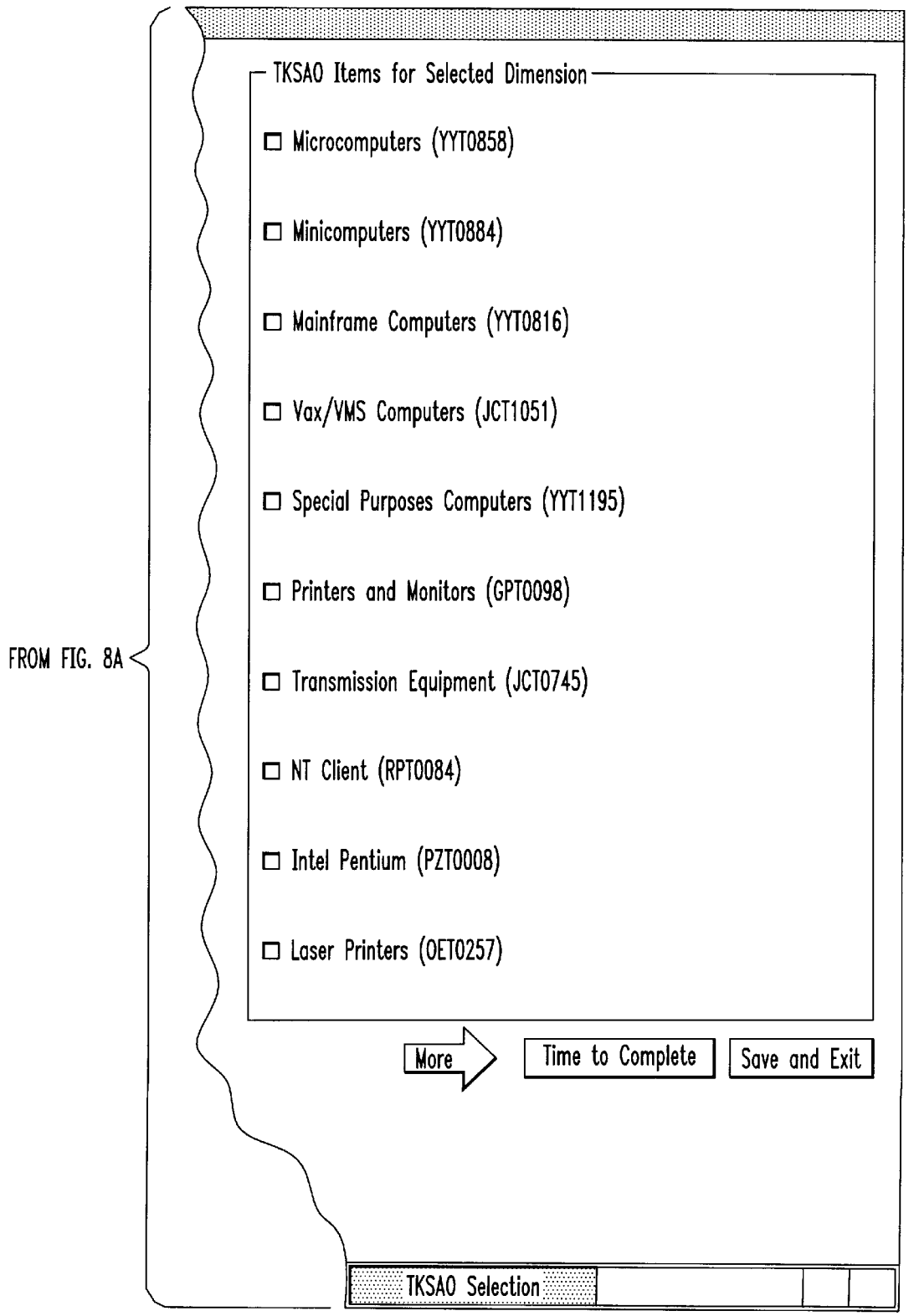
Figure 11B:
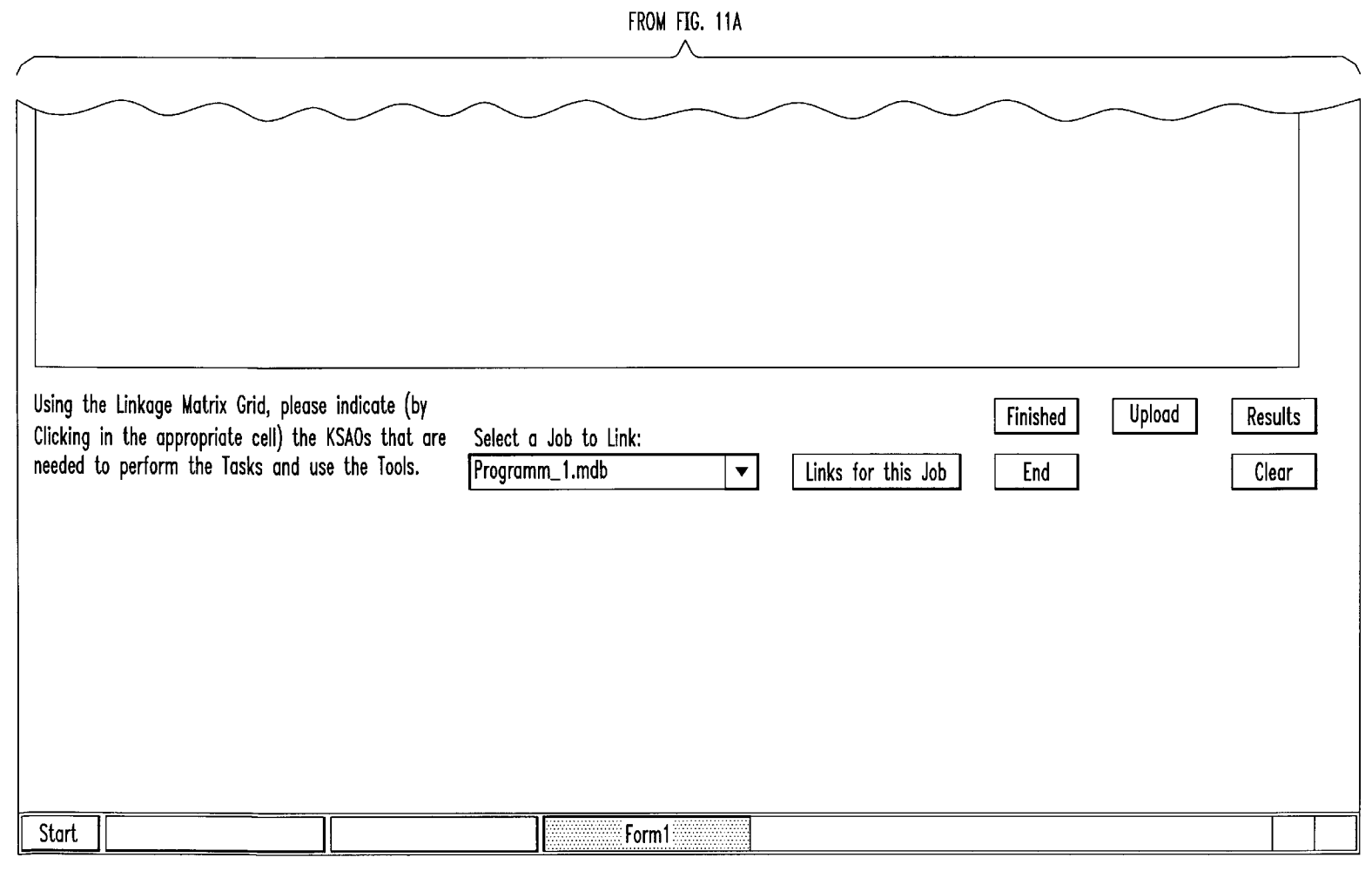

Turning now to FIGS. 6, 7, 8, 9, 10 and 11, illustrated are exemplary output screens of an embodiment of the job analysis wizard 100 of FIG. 1. More specifically, FIG. 6 illustrates a job title output screen. To initiate a job analysis, an analyst may select or enter a job title in the job title output screen. FIG. 7 illustrates a job information output screen. The analyst may provide the job analysis wizard with further information regarding the job. FIG. 8 illustrates a taxonomy output screen. The analyst may select relevant work and worker-oriented dimensions via the taxonomy output screen. FIG. 9 illustrates a preliminary survey program. In the illustrated embodiment, the preliminary survey program contains an outline of sections to be completed by subject matter experts. FIG. 10 illustrates a filter output screen. The analyst may filter out dimensions considered by the subject matter experts to be unimportant. Additionally, the analyst may also filter out dimensions on which subject matter experts disagree. Finally, FIG. 11 illustrates a linkage matrix output screen. Subject matter experts may complete the linkage matrix output screen, indicating whether a particular worker-oriented dimension is required for a particular task.

Although the present invention has been described in detail, those skilled in the art should understand that they can make various changes, substitutions and alterations herein without departing from the spirit and scope of the invention in its broadest form.

What is claimed is:

1. For use with a computer, a job analysis system, comprising:

a master job analysis database containing work-oriented, worker-oriented and work context dimensions and associated work-oriented, worker-oriented and work context dimension job analysis survey portions, said master job analysis database employing fuzzy logic to determine a placement of said work-oriented, worker-oriented and work context dimensions within at least one hierarchal structure;

a products database containing human resource products; and a knowledge management module, associated with said master job analysis database, including:

a survey assembly program that allows a user to select at least one of said work-oriented, worker-oriented and work context dimensions and creates a job analysis survey from at least one of said associated work-oriented, worker-oriented and work context dimension job analysis survey portions, and a survey analysis program that allows said user to identify key worker-oriented dimensions and links said key worker-oriented dimensions to said human resource products in said product database.

2. The system as recited in claim 1 wherein said survey assembly program comprises:

a selection program that creates a preliminary job analysis survey from said at least one of said associated work-oriented, worker-oriented and work context dimension job analysis survey portions; and a survey analysis program that analyzes responses to said preliminary job analysis survey to determine a relevance of said at least one of said work-oriented, worker-oriented and work context dimensions selected and produces a final job analysis survey from said preliminary job analysis survey based on said relevance.

3. The system as recited in claim 1 further comprising a network interface, associated with said knowledge management module, that allows said user to communicate with said knowledge management module via a computer network coupled to said computer.

4. The system as recited in claim 1 wherein said user communicates with said knowledge management module via a graphical user interface (GUI) on a user terminal.

5. The system as recited in claim 1 wherein said user communicates with said knowledge management module via a personal computer (PC) executing a World Wide Web browser.

6. The system as recited in claim 1 wherein said work-oriented dimensions are hierarchically organized into generalized work behaviors, work context, tools and generalized work activities.

7. The system as recited in claim 1 wherein said worker-oriented dimensions are selected from the group consisting of:
  knowledge statements,
  skills, and
  abilities,
  work styles,
  education,
  certifications, and
  languages.

8. The system as recited in claim 1 wherein said products database contains pre-existing human resource products selected from the group consisting of:
  performance appraisals,
  personnel selection systems,
  tests,
  training curricula,
  job aides, and
  Americans with Disabilities Act (ADA) accommodation.

9. The system as recited in claim 1 wherein said survey analysis program is capable of adding new work-oriented, worker-oriented and work context dimensions to said master job analysis database.

10. A method of operating a computer to perform job analysis, comprising:
  providing a master job analysis database containing work-oriented, worker-oriented and work context dimensions and associated work-oriented, worker-oriented and work context dimension job analysis survey portions, said master job analysis database employing fuzzy logic to determine a placement of said work-oriented, worker-oriented and work context dimensions within at least one hierarchal structure;
  providing a products database containing human resource products;
  allowing a user to select at least one of said work-oriented, worker-oriented and work context dimensions;
  creating a job analysis survey from at least one of said associated work-oriented, worker-oriented and work context dimension job analysis survey portions;
  allowing said user to identify key worker-oriented dimensions; and
  linking said key worker-oriented dimensions to said human resource products in said product database.

11. The method as recited in claim 10 wherein said step of creating comprises:
  creating a preliminary job analysis survey from said at least one of said associated worker-oriented, worker-oriented and work context dimension job analysis survey portions;
  analyzing responses to said preliminary job analysis survey to determine a relevance of said at least one of said work-oriented, worker-oriented and work context dimensions selected; and
  producing a final job analysis survey from said preliminary job analysis survey based on said relevance.

12. The method as recited in claim 10 further comprising allowing said user to communicate with said knowledge management module via a computer network coupled to said computer.

13. The method as recited in claim 10 further comprising allowing said user to communicate with said knowledge management module via a graphical user interface (GUI) on a user terminal.

14. The method as recited in claim 10 further comprising allowing said user to communicate with said knowledge management module via a personal computer (PC) executing a World Wide Web browser.

15. The method as recited in claim 10 wherein said work-oriented dimensions are hierarchically organized into generalized work behaviors, work context, tools and generalized work activities.

16. The method as recited in claim 10 wherein said worker-oriented dimensions are selected from the group consisting of:
  knowledge statements,
  skills, and
  abilities,
  work styles,
  education,
  certifications, and
  languages.

17. The method as recited in claim 10 wherein said products database contains pre-existing human resource products selected from the group consisting of:
  performance appraisals,
  personnel selection systems,
  tests,
  training curricula,
  job aides, and
  Americans with Disabilities Act (ADA) accommodation.

18. The method as recited in claim 10 further comprising adding new work-oriented, worker-oriented and work context dimensions to said master job analysis database.

19. For use with a computer, a job analysis system, comprising:
  a master job analysis database containing work-oriented, worker-oriented and work context dimensions and associated work-oriented, worker-oriented and work context dimension job analysis survey portions, said master job analysis database employing fuzzy logic to determine a placement of said work-oriented, worker-oriented and work context dimensions within at least one hierarchal structure;
  a products database containing human resource products;
  a knowledge management module, associated with said master job analysis database, including:
    a survey assembly program that allows a user to select at least one of said work-oriented, worker-oriented and work context dimensions and creates a preliminary job analysis survey from at least one of said associated work-oriented, worker-oriented and work context dimension job analysis survey portions, notifies subject matter experts of an existence of said preliminary job analysis survey, allows said subject matter expert to rate a relevance of said at least one of said work-oriented, worker-oriented and work context dimensions selected, analyzes responses to said preliminary job analysis survey to determine said relevance of said at least one of said work-oriented, worker-oriented and work context dimensions selected, and produces a final job analysis survey from said preliminary job analysis survey based on said relevance, and a survey analysis program that allows said user to identify key worker-oriented dimensions and links said key worker-oriented dimensions to said human resource products in said products database, said survey analysis program being capable of adding new work-oriented, worker-oriented and work context dimensions to said master job analysis database; and a network interface, associated with said knowledge management module, that allows said user to communicate with said knowledge management module via a computer network coupled to said computer.

20. The system as recited in claim 19 wherein said work-oriented dimensions are hierarchically organized into generalized work behaviors, work context, tools and generalized work activities.

21. The system as recited in claim 19 wherein said worker-oriented dimensions are selected from the group consisting of:
knowledge statements,
skills, and
abilities,
work styles,
education,
certifications, and
languages.

22. The system as recited in claim 19 wherein said products database contains pre-existing human resource products selected from the group consisting of:
performance appraisals,
personnel selection systems,
tests,
training curricula,
job aides, and
Americans with Disabilities Act (ADA) accommodation.

23. A method of operating a computer to perform job analysis, comprising:
providing work-oriented, worker-oriented and work context dimensions and associated work-oriented, worker-oriented and work context dimension job analysis survey portions;
employing fuzzy logic to determine a placement of said work-oriented, worker-oriented and work context dimensions within at least one hierarchal structure;
providing human resource products;
allowing a user to select at least one of said work-oriented, worker-oriented and work context dimensions;
creating a preliminary job analysis survey from at least one of said associated work-oriented, worker-oriented and work context dimension job analysis survey portions;
notifying subject matter experts of an existence of said preliminary job analysis survey;
allowing said subject matter experts to rate a relevance of said at least one of said associated work-oriented, worker-oriented selected;
analyzing responses to said preliminary job analysis survey to determine said relevance of said at least one of said work-oriented, worker-oriented and work context dimensions selected;
producing a final job analysis survey from said preliminary job analysis survey based on said relevance;
allowing said user to identify key worker-oriented dimensions; and
linking said key worker-oriented dimensions to said human resource products in said product database.

24. The method as recited in claim 23 wherein said work-oriented dimensions are hierarchically organized into generalized work behaviors, work context, tools and generalized work activities.

25. The method as recited in claim 23 wherein said worker-oriented dimensions are selected from the group consisting of:
knowledge statements,
skills, and
abilities,
work styles,
education,
certifications, and
languages.

26. The method as recited in claim 23 wherein said human resource products are preexisting human resource products selected from the group consisting of:
performance appraisals,
personnel selection systems,
tests,
training curricula,
job aides, and
Americans with Disabilities Act (ADA) accommodation.

* * * * *